United States Patent
Gostynski et al.

(10) Patent No.: US 8,970,673 B2
(45) Date of Patent: Mar. 3, 2015

(54) METHOD AND SYSTEM FOR STEREOSCOPIC SCANNING

(75) Inventors: Victor Gostynski, Ashdod (IL); Dror Lubin, Tel Aviv (IL)

(73) Assignee: Israel Aerospace Industries Ltd., Lod (IL)

( * ) Notice: Subject to any disclaimer, the term of this patent is extended or adjusted under 35 U.S.C. 154(b) by 226 days.

(21) Appl. No.: 13/301,141

(22) Filed: Nov. 21, 2011

(65) Prior Publication Data

US 2012/0249739 A1 Oct. 4, 2012

Related U.S. Application Data

(63) Continuation-in-part of application No. PCT/IL2010/000401, filed on May 20, 2010.

(30) Foreign Application Priority Data

May 21, 2009 (IL) .......................................... 198883

(51) Int. Cl.
*H04N 13/02* (2006.01)
*G01C 11/02* (2006.01)
(Continued)

(52) U.S. Cl.
CPC .............. *G01C 11/025* (2013.01); *G01C 11/06* (2013.01)
USPC .............................. 348/46; 348/145; 348/147

(58) Field of Classification Search
CPC .......... H04N 13/0239; H04N 13/0055; H04N 13/0296; H04N 13/0497; H04N 13/0242; H04N 21/23424; H04N 19/00266; H04N 9/47; H04N 7/18; G11B 27/036; G01S 17/89; G01S 17/023; G01C 11/02; G01T 17/05; G06T 17/05
USPC ........... 348/46, 145, 147, 144; 382/154, 284, 382/106
See application file for complete search history.

(56) References Cited

U.S. PATENT DOCUMENTS 5,138,444 A * 8/1992 Hiramatsu ....................... 348/50
5,155,597 A * 10/1992 Lareau et al. ................... 348/311
(Continued)

FOREIGN PATENT DOCUMENTS

EP 1783455 A2 5/2007
JP 57122309 A 7/1982

OTHER PUBLICATIONS

Lavigne, Valérie, et al., "Step-Stare Technique for Airborne High Resolution Infrared Imaging" Airborne Intelligence, Surveillance, Reconnaissance (ISR) Systems and Applications; Edited by Andraitis Arthur A., et al. Proceedings of the SPIE, (2004) pp. 128-138, vol. 5409.

(Continued)

*Primary Examiner* — Dave Czekaj
*Assistant Examiner* — Dramos I Kalapodas
(74) *Attorney, Agent, or Firm* — Nath, Goldberg & Meyer; Jerald L. Meyer; Katelyn J. Bernier (57) ABSTRACT

Provided is a system and method for scanning a target area, including capturing images from onboard a platform for use in producing one or more stereoscopic views. A first set of at least two image sequences of at least two images each, covering the target area or a subsection thereof is captured. As the platform continues to move forward, at least one other set of images covering the same target area or subsection thereof is captured. At least one captured image from each of at least two of the sets may be used in producing a stereoscopic view.

27 Claims, 5 Drawing Sheets

(51) Int. Cl.
*G01C 11/06* (2006.01)
*H04N 9/47* (2006.01)

(56) References Cited

U.S. PATENT DOCUMENTS

| | | | | |
|---|---|---|---|---|
| 5,251,037 | A | * | 10/1993 | Busenberg .................... 348/147 |
| 5,668,593 | A | | 9/1997 | Lareau et al. |
| 5,668,594 | A | * | 9/1997 | Cahill, III .................... 348/194 |
| 6,658,207 | B1 | * | 12/2003 | Partynski et al. ................. 396/7 |
| 6,747,686 | B1 | * | 6/2004 | Bennett ........................ 348/145 |
| 7,363,157 | B1 | | 4/2008 | Hanna et al. |
| 2004/0252881 | A1 | * | 12/2004 | Levin et al. .................... 382/154 |
| 2005/0177307 | A1 | * | 8/2005 | Greenfeld et al. ............. 701/220 |
| 2007/0031064 | A1 | * | 2/2007 | Zhao et al. .................... 382/285 |
| 2007/0242135 | A1 | * | 10/2007 | Rosenblum et al. .......... 348/144 |
| 2008/0221843 | A1 | * | 9/2008 | Shenkar et al. ................... 703/1 |
| 2009/0009602 | A1 | * | 1/2009 | Yavin et al. .................... 348/144 |

OTHER PUBLICATIONS

Zhu, Lin et al., "Triple Image Matching for Airborne Digital Sensor ADS40", GIS Institute, PASCO Corporation.

* cited by examiner

METHOD AND SYSTEM FOR STEREOSCOPIC SCANNING

CROSS-REFERENCE TO RELATED APPLICATIONS

This application is a continuation-in-part of PCT application No. PCT/IL2010/000401 filed on May 20, 2010, which is hereby incorporated by reference herein.

FIELD OF THE INVENTION

This invention relates to stereoscopic images.

BACKGROUND OF THE INVENTION

A stereoscopic (3 dimensional) image can be created from two or more two dimensional images. The two dimensional images are taken from different positions, for instance by using different cameras at different positions, or by moving the same camera between positions.

For example, a camera can be placed onboard a moving object (termed platform), such as an aircraft, and successive images may be taken with at least 50% forward overlap, or more typically 56%-60% forward overlap. Forward overlap refers to overlap along (i.e. parallel) to the track of the platform. The stereoscopic view of the overlap corresponding area is produced based on those two successive images. The stereoscopic angle $\theta_s$ achieved for an approximately 60% forward overlap can be shown to be $$\theta_s = 0.4 \times (L/R) \text{ radians} \quad \text{(formula 1)}$$

where L is the frame width (Frame width is the dimension of the footprint of the frame on the ground in the cross-line-of-sight direction which is the direction perpendicular to the line defined by the point on the ground beneath the camera and the point where the camera's line of sight points on the ground) and R is the imaging range (i.e. distance from the camera to the center of the imaged surface).

These images may later be combined by means of a stereo viewing system to achieve depth perception.

In order to provide wider coverage across, i.e. perpendicular or lateral, to the track of the moving platform, a still or video camera onboard the platform may "step" across the track, taking images which overlap with one another in the direction perpendicular to the track of the platform. Typically, in order to achieve a uniform or nearly uniform overlap between two given images adjacent along track from one another and two other images adjacent along track from one another and within the same two sequences as the two given images, the scanning is always performed from near to far (or alternatively from far to near). Therefore if a sequence of images perpendicular to the track was taken from near to far, the camera after finishing the sequence makes a large "step" so as to be able to take the next sequence of images also from near to far. Alternatively, a push-broom camera may sweep across the track, with the sweeping performed always near to far (or alternatively far to near).

U.S. Pat. No. 6,747,686 to Bennett describes an aerial reconnaissance camera and method for generating a first image of the terrain of interest with the camera pointing angle oriented or rotated about an azimuthal axis some angular amount ($\theta$1) to a first, typically forward orientation, i.e. forward to a cross-line of flight direction. An image is obtained of the ground at this orientation. Then the camera is rotated about the azimuthal axis to new angular value ($\theta$2), which will typically be aft of the cross line of flight direction. An image is generated at this value. This process of rotating the camera about the azimuthal axis and generating images in forward and aft orientations continues over and over. Eventually, as the aircraft flies past the terrain of interest, any given location will have been imaged from two different perspectives—forward and aft.

EP Patent Application 1 783 455 assigned to Rafael-Armament Development Authority Ltd. describes an airborne reconnaissance system comprising (1) Gimbals having at least two degrees of freedom; (2) At least one array of light sensors positioned on the gimbals, for being directed by the same within at least two degrees of freedom; (3) Map storage means for storing at least one Digital Elevation map of an area of interest, divided into portions; (4) Inertial Navigation System for real-time providing to a gimbals control unit navigation and orientation data of the aircraft with respect to a predefined global axes system; (5) Portion selection unit for selecting, one at a time, another area portion from the area of interest; and (6) servo means for directing the gimbals. The system uses data from the inertial navigation system and from the digital elevation map for real-time calculating direction to selected area portions, and for maintaining the direction during integration of light from the terrain, and for producing corresponding images of area portions.

SUMMARY OF THE INVENTION

In accordance with an aspect of the invention, there is provided a system for scanning a target area including capturing images for use in producing one or more stereoscopic views, the system comprising: a planning module configured to prepare data on a target area; a navigation module configured to receive navigation data; a control module configured to compare navigation data received by the navigation module with data prepared on the target area and to trigger scanning of the target area based on the comparing; a scanning module configured to compute system points of interest in the target area in response to the trigger; a payload control system configured to translate computed system points of interest into camera attitudes; and at least one camera onboard a platform configured to capture images whose footprints are centered around computed system points of interest, based on the camera attitudes, including configured to capture a first set of at least two image sequences of at least two images each, covering the target area or a sub section thereof, and configured, as the platform continues to move forward, to capture at least one other set of images covering substantially the same target area or sub section thereof; wherein at least one captured image from each of at least two of the sets are destined to be used in producing a stereoscopic view.

In accordance with an embodiment of the invention, configured to capture includes configured to capture the set image sequences in alternating directions so that a camera attitude is not adjusted by more than a camera field of view between any two consecutively captured images in the set.

In accordance with an embodiment of the invention, the first set includes an even number of image sequences.

In accordance with an embodiment of the invention, each of the image sequences includes images captured sequentially in a direction lateral to the direction of movement of the platform.

In accordance with an embodiment of the invention, the stereoscopic view is derived from at least two captured images, the images footprints are not centered around consecutive system points of interest within any of the sets.

In accordance with an embodiment of the invention, a percentage of overlap between adjacent images within any of the sets of images provides continuity in coverage.

In accordance with an embodiment of the invention, two captured images which are destined to be used in producing the stereoscopic view are captured at a stereoscopic angle which is larger than half a camera Field of View (FOV).

In accordance with an embodiment of the invention, the platform is configured to move in the air, on land, or on water.

In accordance with an embodiment of the invention, the at least one camera is selected from a group comprising: visible light cameras, infra-red cameras, multi-spectral, hyper-spectra, still image frames cameras, video cameras, push-broom cameras, or any combination of the above.

In accordance with an embodiment of the invention, two captured images which are destined to be used in producing the stereoscopic view have 100% overlap.

In accordance with an embodiment of the invention, the system is further configured to capture additional images covering another subsection of the target area, if any.

In accordance with an embodiment of the invention, the system is configured to capture the additional images, if any, after capturing the first set and the at least one other set.

In accordance with an embodiment of the invention, the system is configured to repeat a pattern whereby images of the first set were captured when capturing each of the at least one other set of images.

In accordance with an aspect of the invention, there is provided a method of scanning a target area, including capturing images for use in producing one or more stereoscopic views, the method comprising: comparing navigation data with target area data and based on the comparing deciding to begin scanning the target area; computing system points of interest in the target area; and from onboard a platform, capturing images whose footprints are centered around computed system points of interest, including: capturing a first set of at least two image sequences of at least two images each covering the target area or a sub section thereof, and as the platform continues to move forward, capturing at least one other set of images covering substantially the same target area or sub section thereof; wherein at least one captured image from each of at least two of the sets are destined to be used in producing a stereoscopic view.

In accordance with an embodiment of the invention, the capturing includes: capturing the set image sequences in alternating directions and not adjusting by more than a camera field of view a camera attitude between any two consecutively captured images in the set.

In accordance with an embodiment of the invention the first set includes an even number of image sequences.

In accordance with an embodiment of the invention, each of the image sequences includes images captured sequentially in a direction lateral to the direction of movement of the platform.

In accordance with an embodiment of the invention, the stereoscopic view is derived from at least two captured images, the images footprints are not centered around consecutive system points of interest within any of the sets.

In accordance with an embodiment of the invention, a percentage of overlap between adjacent images within any of the sets of images provide continuity in coverage.

In accordance with an embodiment of the invention, two captured images which are destined to be used in producing the stereoscopic view are captured at a stereoscopic angle which is larger than half a camera Field of View (FOV).

In accordance with an embodiment of the invention, two captured images which are destined to be used in producing the stereoscopic view have 100% overlap.

In accordance with an embodiment of the invention, the method further comprises: capturing additional images covering another subsection of the target area, if any.

In accordance with an embodiment of the invention, the additional images, if any, are captured after capturing the first set and the at least one other set.

In accordance with an embodiment of the invention, the platform moves in the air, on land, or on water.

In accordance with an embodiment of the invention, the images are captured using at least one camera selected from a group comprising: visible light cameras, infra-red cameras, multi-spectral, hyper-spectra, still image frames cameras, video cameras, push-broom cameras, or any combination of the above.

In accordance with an embodiment of the invention, the capturing of the at least one other set of images includes: repeating a pattern whereby images of the first set were captured.

In accordance with an aspect of the invention, there is provided a computer program product comprising a computer useable medium having computer readable program code embodied therein for scanning a target area, including capturing images for use in producing one or more stereoscopic views, the computer program product comprising: computer readable program code for causing the computer to compare navigation data with target area data and based on the compare to decide to begin scanning the target area; computer readable program code for causing the computer to compute system points of interest in the target area; and computer readable program code for causing the computer to, from onboard a platform, capture images whose footprints are centered around computed system points of interest, including: computer readable program code for causing the computer to capture a first set of at least two image sequences of at least two images each, covering the target area or a sub section thereof, and computer readable program code for causing the computer to, as the platform continues to move forward, capture at least one other set of images covering substantially the same target area or sub section thereof; wherein at least one captured image from each of at least two of the sets are destined to be used in producing a stereoscopic view.

In accordance with an aspect of the invention, there is provided a system for scanning frames in a target area, this system being used for producing a stereoscopic view of a target area, this system comprising a planning module configured to prepare data on a target area; a navigation module configured to receive navigation data; a control module configured to compare navigation data received by the navigation module with data prepared on the target area and to trigger scanning of the target area based on comparing; a scanning module configured to compute system points of interest in response to the trigger; a payload control system configured to translate computed system points of interest into camera attitudes; a camera onboard a platform configured to capture frames whose footprints are centered around the computed system points of interest, based on the camera attitudes; wherein for a set of captured frames, an attitude of the camera is not adjusted by more than the field of view between two consecutive system points of interest; and wherein the camera is configured to complete the capturing of the set, and then repeat the capture of this set, prior to capturing any additional system points of interest.

In accordance with an embodiment of the invention, the stereoscopic view of any sub section within the target area is derived from at least two frames, and the frames footprints are not centered around consecutive system points of interest within the set.

In accordance with an embodiment of the invention, the percentage of overlap between adjacent frames within a set of frames is determined based on continuity considerations only.

In accordance with an embodiment of the invention, the stereoscopic angle of the camera when taking two images used for producing the stereoscopic view is larger than half the Field of View (FOV).

In accordance with an embodiment of the invention, the platform moves in the air, on land, or on water.

In accordance with an embodiment of the invention, the frames are captured using a camera selected from a group of visible light cameras, infra-red cameras, multi-spectral, hyper-spectra, still image frames cameras, video cameras, push-broom cameras, or any combination of the above.

In accordance with an aspect of the invention, there is provided a method of scanning frames in a target area, the method being used for producing a stereoscopic view of the target area, this method comprising comparing navigation data with target area data and, based on the comparing, deciding to begin scanning the target area; computing system points of interest for the target area; capturing a set of frames, and not adjusting by more than a field of view an attitude between two consecutive frames in the set; and after completing a capture of the set, recapturing the set, prior to capturing any additional frames.

In accordance with an embodiment of the invention, the method further comprises: after completing a recapture of the set, proceeding to capture additional system points of interest, if there are additional system points of interest that remain to be captured.

In accordance with an embodiment of the invention, the number of frames in a set is smaller or equal to the value calculated by the formula: floor $(0.5*(T-2*t1)/t2)$, wherein T is the available time to perform scanning of a target area, t1 is the time required to move the camera towards the adjacent frame in the along track direction, and t2 is the time required to move the camera from the last image in one sequence to the first image in the next sequence.

In accordance with an embodiment of the invention, the platform moves in the air, on land, or on water, using the above method.

In accordance with an embodiment of the invention, the frames are captured using a camera selected from a group of visible light cameras, infra-red cameras, multi-spectral, hyper-spectra, still image frames cameras, video cameras, push-broom cameras, or any combination of the above.

In accordance with an aspect of the invention, there is provided a method of scanning frames in a target area, this method being used for producing a stereoscopic view of said target area, this method comprising capturing a set of frames, and not adjusting by more than a field of view an attitude between two consecutive frames in the set.

In accordance with an embodiment of the invention, the platform moves in the air, on land, or on water, using the above method.

In accordance with an embodiment of the invention, if a stereo image of the target area is required, then after completing a capture of the set of frames, recapturing the set of frames, prior to capturing any additional frame.

In accordance with an embodiment of the invention, the frames are captured using a camera selected from a group of visible light cameras, infra-red cameras, multi-spectral, hyper-spectra, still image frames cameras, video cameras, push-broom cameras, or any combination of the above, using the above method.

In accordance with an aspect of the invention, there is provided a method of scanning frames in a target area using a camera, this method being used for producing a stereoscopic view of a target area, the method comprising capturing a first set of frames and a second set of frames wherein a stereoscopic image of any sub section of the target area is produced from a first frame from the first set and a second frame from the second set, the stereoscopic angle of said camera when capturing the first frame and the second frame is larger than half the Field of View (FOV), and an attitude of the camera is not adjusted more than once between capturing of the first set and capturing of the second set.

In accordance with an embodiment of the invention, each sub section of the target area is covered by two images having substantially 100% overlap.

In accordance with an embodiment of the invention, the frames are captured using a camera selected from a group of: visible light cameras, infra-red cameras, multi-spectral, hyper-spectra, still image frames cameras, video cameras, push-broom cameras, or any combination of the above.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Described herein are embodiments for capturing images for the purpose of stereoscopic imaging.

In some embodiments, the utilized system and method may possibly allow for a wider (stereoscopic) angle between images which may be used to produce a stereoscopic view compared to some prior art systems and methods. Other advantages of various embodiments of the invention may possibly include inter-alia a more time efficient scanning of a target area, an increased width of the captured area, and/or an increased overlap between images which may be used to produce a stereoscopic view, compared to some prior art systems and methods.

As used herein, the phrase "for example," "such as" and variants thereof describe non-limiting embodiments of the present invention.

Reference in the specification to "one embodiment", "an embodiment", "some embodiments", "another embodiment", "other embodiments", "one case", "some cases", "other cases", or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" "one case", "some cases", "other cases", or variations thereof does not necessarily refer to the same embodiment(s).

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Unless specifically stated otherwise, as apparent from the following discussions, it is appreciated that throughout the specification discussions, utilizing terms such as, preparing, deciding, triggering, comparing, computing, capturing, scanning, recapturing, uploading, inputting, outputting, configuring, storing, enabling, disabling, generating, modifying, sequencing, associating, communicating, receiving, loading, retrieving, translating, completing, performing, initiating, transferring, sending, redirecting, providing, determining, indicating, processing, executing, or the like, refer to the action and/or processes of any combination of software, hardware and/or firmware.

Embodiments of the present invention may use terms such as module, network, element, processor, architecture, apparatus, system, sub-system, logic, component, function, unit, device, or variants thereof (in single or plural form) for performing the operations described herein. These terms, as appropriate, refer to any combination of software, hardware and/or firmware capable of performing the operations as defined and explained herein.

Figure 1:
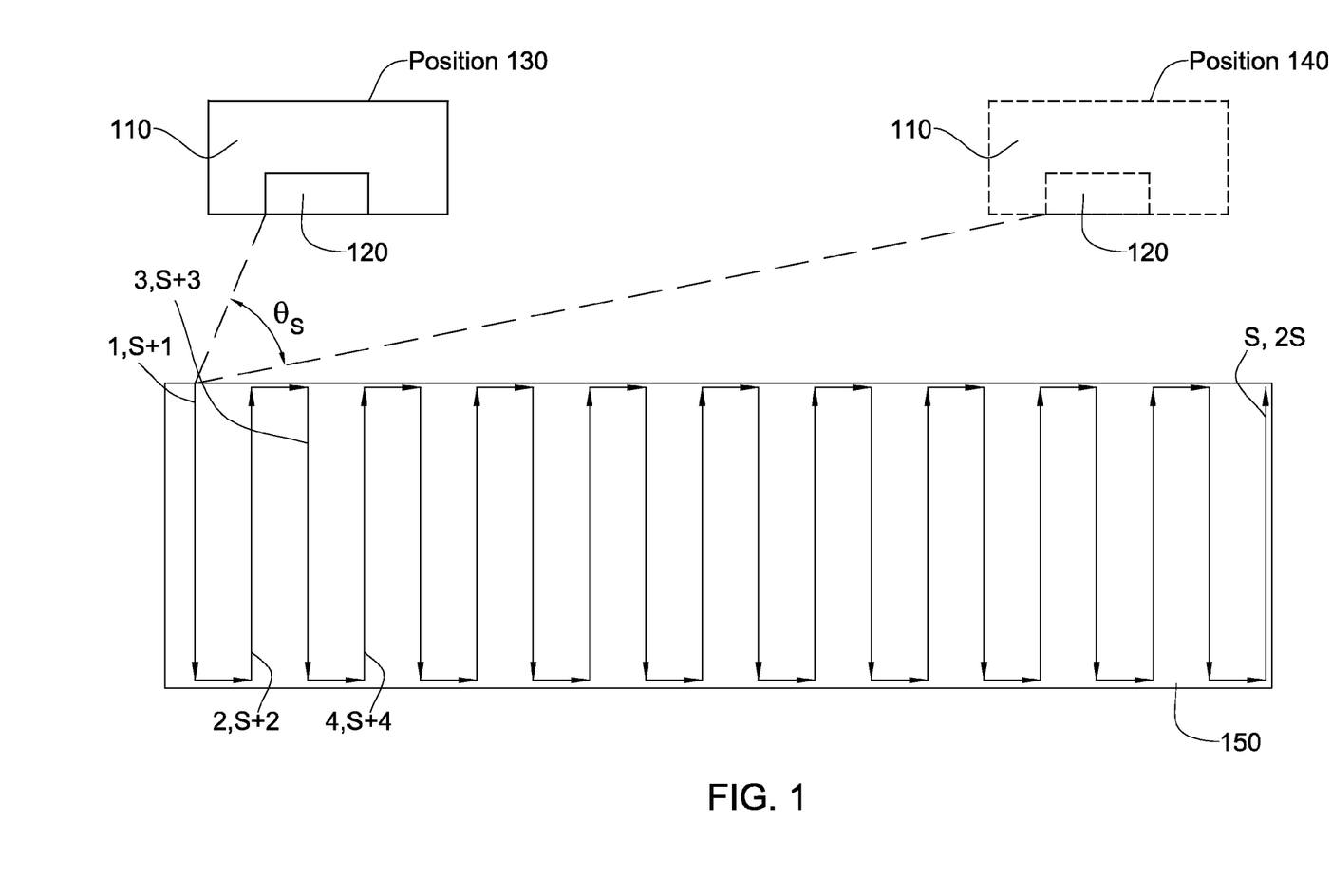
FIG. 1 is a schematic illustration of the capturing of images by a camera onboard a platform, according to an embodiment of the present invention.

Referring now to the drawings, FIG. 1 is a schematic illustration of the capturing of images by a camera onboard a platform, according to an embodiment of the present invention.

Depending on the embodiment, one or more cameras can be used to capture images. Examples of cameras which can be used include visible light cameras, infra-red cameras, multispectral, hyper-spectra, any combination of the above, etc. The camera(s) used can take still image frames, video which comprises image frames, and/or can be of the push-broom type which sweeps the area so that each sweep (for example perpendicular to the track of the moving object) is considered one image.

Depending on the embodiment, the platform can be any moving object, for example which moves on the ground, on water, or in the air.

FIG. 1 illustrates the platform 110 at two different positions, position 130 and position 140. The target area to be covered by stereoscopic imaging is represented by line 150. Each target area sub-section in area 150 should be imaged at least twice, each time from a different angle in order to produce a substantially complete stereoscopic coverage of area 150. According to certain embodiments of the present invention the pattern in which area 150 is sequentially imaged is represented by the continuous arrowed line. This pattern is by no way limiting and any other pattern may be used according to other embodiments of the present invention as further illustrated in FIG. 5.

Figure 5A:
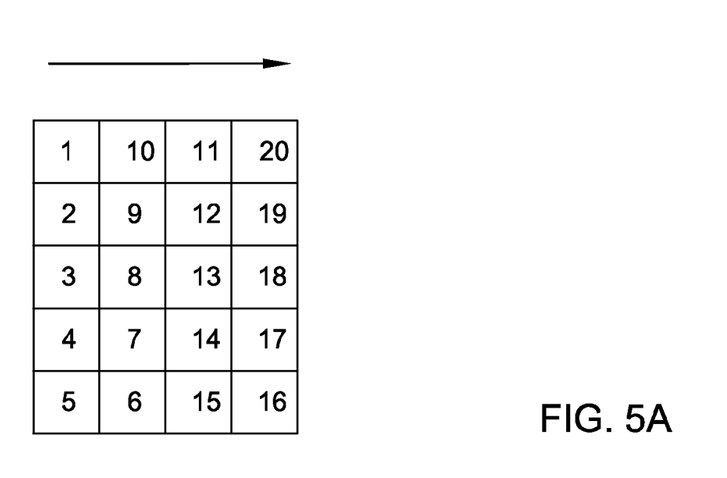
FIGS. 5A-C are schematic illustrations of the capturing of images by a camera onboard a platform, according to certain embodiments of the present invention.
Figure 5B:
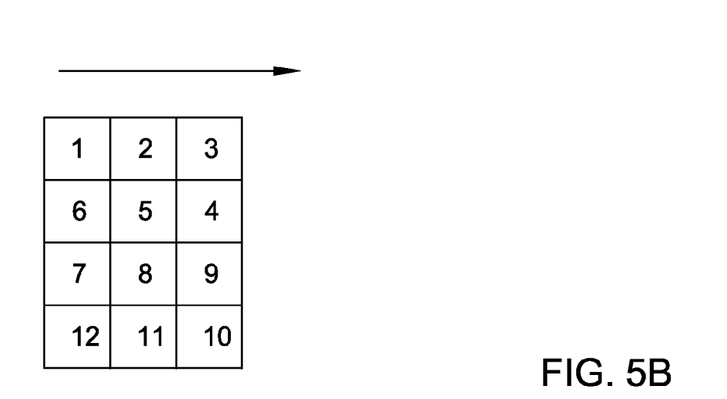
Figure 5C:
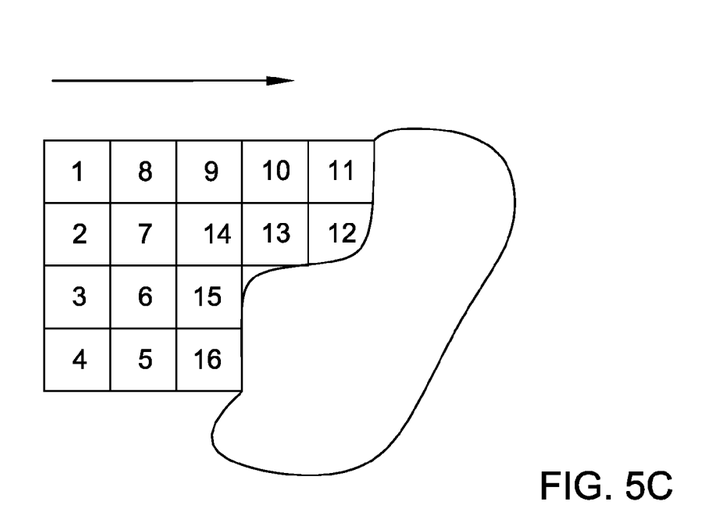

FIGS. 5A-C are schematic illustrations of the capturing of images by a camera onboard a platform, according to certain embodiments of the present invention. The numbering of the frames represents the order in which frames are captured within a set. The arrowed line represents the movement direction of the platform. FIG. 5A represents a case where each captured set contains 4 sequences, each sequence contains 5 frames. FIG. 5B represents a case where there are 4 sequences in a set, each sequence includes 3 frames in a direction parallel to the movement direction of the platform. FIG. 5C represents a case where the scanned area includes a lake. The area of the lake itself is not considered interesting and is omitted from the target area. The set of frames therefore includes 16 frames that cover the target area around the lake but not the lake area itself. This way scanning time is saved. In each of FIGS. 5A-C the set of frames must be captured at least twice, sequentially in order to produce the stereoscopic view of the target area.

According to certain embodiments of the present invention, the pattern is repeated twice so as to achieve multiple images coverage. According to certain other embodiments, the pattern is repeated more than twice for a given target area. A sequence is a sequentially taken set of one or more images taken one after the other in the same direction. Let s be the number of sequences taken in each iteration of the pattern represented by the arrowed line. Therefore, the first sequence (indexed 1) which covers a sub-section of area 150 is taken when the platform is in position 130 and substantially the same sub-section is covered again at a later stage when the platform has moved forward to position 140 and the sequence is indexed as s+1. At both positions, one or more cameras in camera unit 120 capture substantially the same target area. The pattern in which the target area is scanned is noted in FIG. 1. Arbitrarily, camera unit 120 captures the first sequence of image(s) in the lateral direction (sequence 1) from near to far (where near refers to the position closer to the platform and far refers to the position farther from the platform). The next sequence of image(s) in the lateral direction (sequence 2) is captured from far to near. The alternation between near to far and far to near continues for a certain number of sequences, s. In certain embodiments s is an even number. In this case the change in the attitude of the camera when moving from the last image of the last sequence in one set to the first image in the first sequence in the next set is reduced compared with the case where the number of sequences taken in each phase is odd. It is noted that the first sequence of images in the lateral direction could have instead been captured from far to near and the next sequence from near to far, etc. It is also noted that each sequence can include one or more images. For example, assuming that a camera captures still frames or video frames, the camera may capture one or more frames in each sequence. As another example, assuming a pushbroom, each sweep (i.e. each sequence) may be considered as one image, or may be related to as a continuous sequence of frames, each frame being very narrow (e.g. one line only) of the above mode. Although as stated above in some embodiments a sequence may include one or more images, a sequence typically although not necessarily includes two or more images, as mentioned below.

It is noted that within a sequence, the attitude of any camera within camera unit 120 conventionally does not need to change substantially because sequentially taken images cover neighboring target area sub sections respectively therefore requiring only minimal attitude change. In the illustrated embodiment of FIG. 1, there is also no need for any substantial change in camera attitude between sequences (up to sequence s+1), due to the alternation between near to far and far to near sequences (again, because the first image in a successive sequence and the last image in the previous sequence cover neighboring target area sub sections respectively therefore requiring only minimal attitude change). Therefore during a set of s sequences in the illustrated embodiment, the change in the attitude between successive images is less than the field of view of the camera. The field of view (FOV) is the opening angle which the camera "sees". The coverage on the ground is the FOV (in radians) multiplied by the range from the camera to the target area.

According to certain embodiments, the speed of the platform carrying the camera is adjusted so as to avoid the attitude change of the camera between sequences.

Because the camera attitude is not required to change substantially during the acquisition of a set of s sequences, time is saved which in some embodiments may be used to increase the width of one or more of the sequences (i.e. increase the number of images taken in that sequence). Assuming a camera which captures more than one image frame per sequence in a lateral direction, it can be shown that the number of frames in the lateral direction sequence may in some embodiments match the following condition:

$$\text{Number of frames} \leq \text{floor}(0.5*(T-2*t1)/t2) \quad \text{(formula 2)};$$

i.e. the number of frames is smaller or equal to the value represented by the right side of formula 2 where T is the available time to scan a target area, where a target area is covered by a series of frames taken in succession that cover a continuous area on the ground, t1 is the time required to move the camera towards the adjacent frame in the across track direction, and t2 is the time required to move the camera from the last image in one sequence to the first image in the next sequence (i.e. towards the adjacent frame in the along track direction). See Appendix A for details.

After s sequences where taken, camera unit 120 repeats the same s sequences from a second position, so that the $s+1^{th}$ sequence captured is substantially identical to captured sequence 1, the $s+2^{th}$ sequence captured is substantially identical to captured sequence 2, etc, before moving onto capturing the next set of sequences (which includes v sequences, where v may or may not be equal to s). Therefore, the first and the $s+1^{th}$ sequence may overlap by approximately 100%, the second and the $s+2^{th}$ sequence captured may overlap by approximately 100%, etc. It is noted however that overlap less than approximately 100% is also possible, and would still be an improvement over the typical prior art overlap of about 60%. As illustrated in FIG. 1, platform 110 is at position 130 when the first sequence is captured and at position 140 when the $s+1^{th}$ sequence is captured by camera unit 120. The stereoscopic angle can therefore be shown to be in some embodiments:

$$\theta_s = (s-1) \times 0.4 \times (L/R) \text{radians} \quad \text{(formula 3)}$$

where L is the frame width and R is the imaging range (i.e. distance from the camera to the center of the imaged surface).

This stereoscopic angle should not be considered binding on all embodiments.

For simplicity of illustration, position 140 is shown as parallel to position 130 in FIG. 1, however this relationship is not binding and was chosen for illustration for ease of understanding of the reader. Depending on the embodiment, position 140 may have any relationship to position 130. When it is mentioned that the platform moves forward from position 130 to position 140, the term "forward" should not be construed to limit the relationship between positions 130 and 140, but the term forward should instead be understood as clarifying that positions 140 and 130 are not the same (i.e. moving forward means that the platform does not return to the exact same position when capturing the s+1th sequence as the first sequence).

There are two manners in which camera unit 120 may operate, the strip manner and the spot manner. In the strip manner, the coverage of the scanned target area on the ground advances in a similar pace to the pace of platform 110. Therefore repetition of sets of sequences (e.g. s sequences, v sequences) may continue indefinitely. In the spot manner, the coverage of the scanned target area on the ground does not necessarily advance in a similar pace to the pace of platform 110. In this case, if finite coverage is allowable, and it is not necessary to repeat sets of sequences indefinitely; it is possible to have the coverage on the ground advance more slowly than platform 110. For example, at the beginning of the capturing of the images, platform 110 may be behind the beginning of the area to be covered and because platform 110 moves more quickly than the coverage of the scanned target area on the ground, at the end of the capturing of the images, platform will be ahead of the end of the area to be covered. In this example, the available time to scan the target area, T, may be increased compared with the strip mode and consequently the number of frames taken of a given target area may also be increased.

FIG. 1 shows a set of sequences where s=20 but this should not be considered binding and has been arbitrarily mentioned as a round number. As mentioned below the number of sequences s may be any number greater than 1. Moreover, the number of sequences in sets may change between one group of sets and another. For example, three sets of the same target area, each set including 20 sequences may be followed by two sets of the next target area each including 25 sequences. FIG. 1 also implies that the sequences captured are of uniform width at each point along the track of platform 110, but this is not necessarily the case, as described in more detail further below.

FIG. 1 shows sequences in the lateral direction, but this should not be considered binding. As described for example with reference to FIG. 5, sequences may be in any direction, and in some embodiments sequences may possibly be in a direction parallel to the movement direction of the platform.

FIG. 1 shows sequences alternating in direction for covering a target area or sub-section, but this should not be considered binding. As mentioned above, the pattern is not limited and as mentioned below the overlap between adjacent images may or may not be uniform. For instance, when covering a target area or subsection, sequences may possibly in some embodiments be captured in the same direction rather than in alternating directions. Referring to FIG. 1, it is possible that in some embodiments both the first and second sequence may instead be captured from near to far or from far to near.

Figure 2:
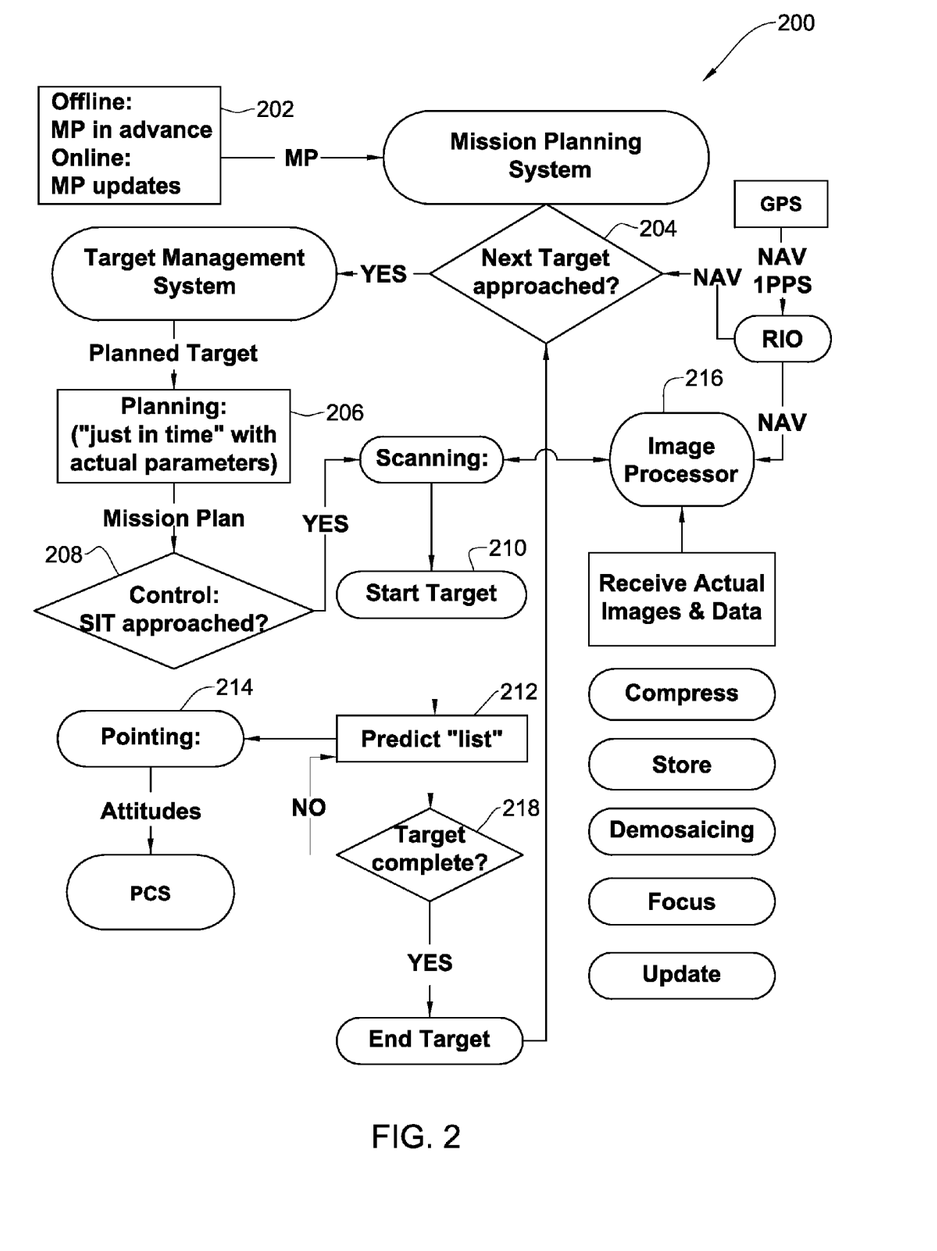
FIG. 2 is a flowchart of a method for carrying out a mission by aircraft including scanning one or more target areas, according to an embodiment of the present invention.
Figure 3:
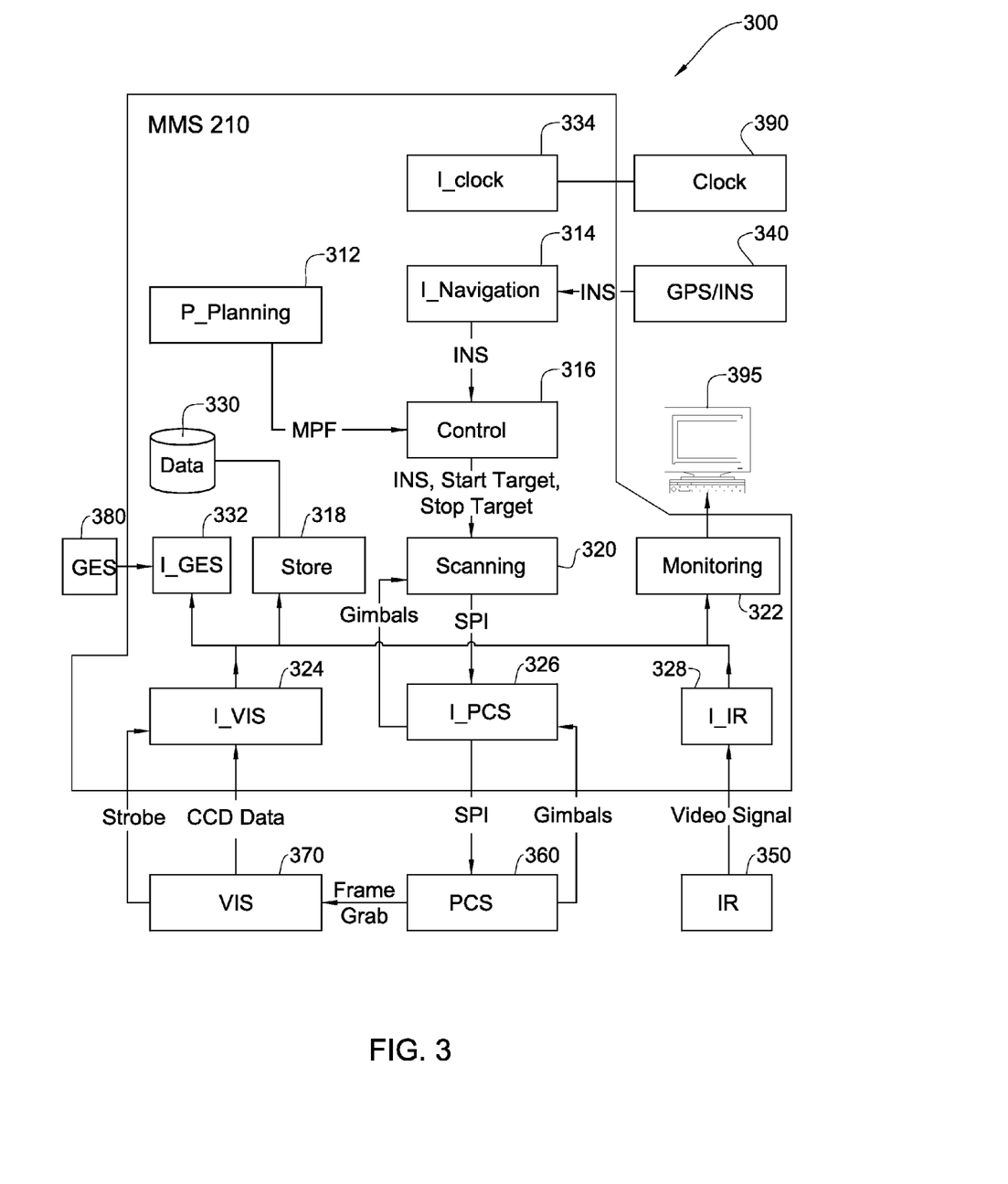
FIG. 3 is a block diagram of a system for carrying out a mission by aircraft including scanning one or more target areas, according to an embodiment of the present invention.
Figure 4:
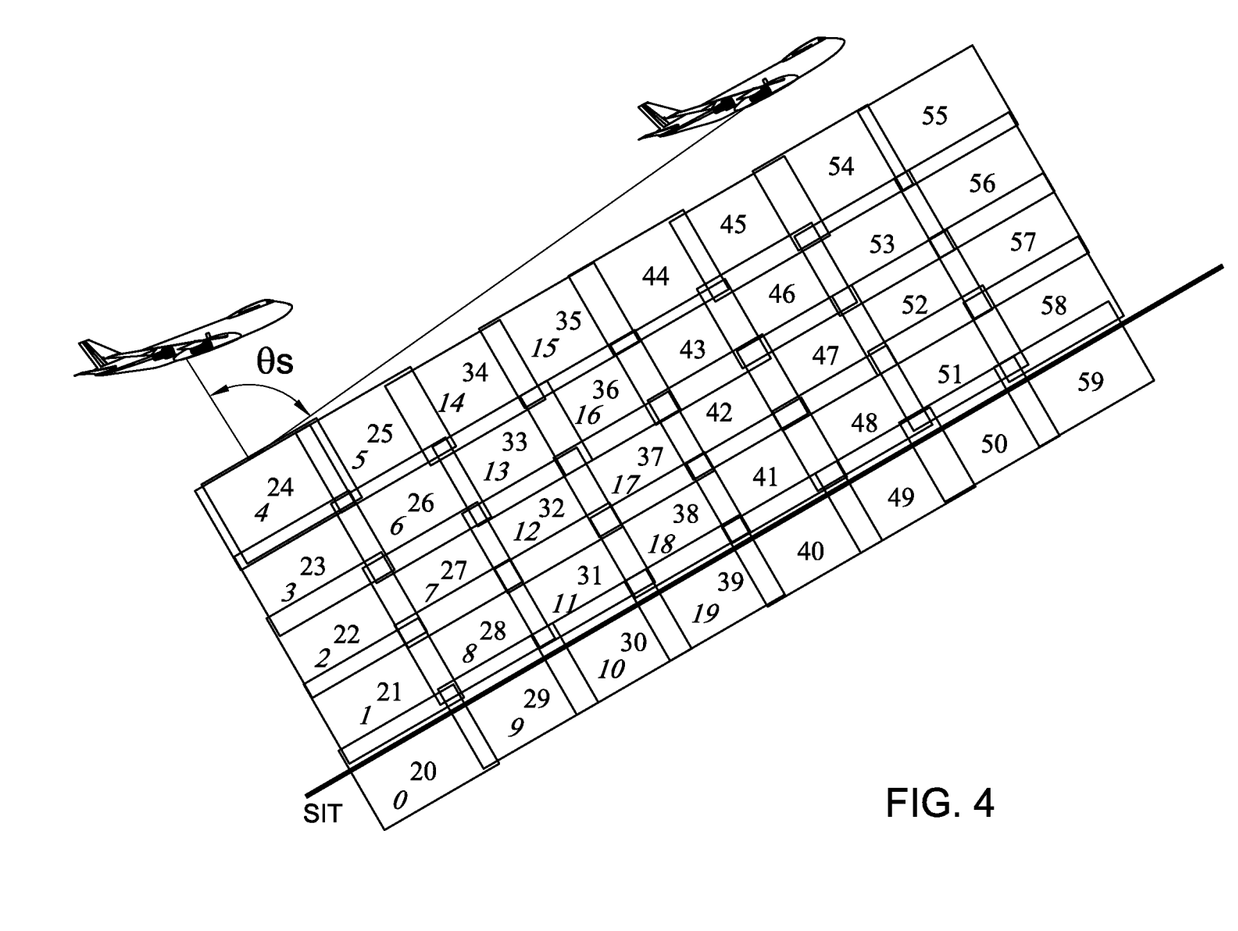
FIG. 4 is a schematic illustration of the capturing of images by a camera onboard an aircraft, according to an embodiment of the present invention.

FIGS. 2, 3, and 4 describe in more detail various embodiments where platform 110 is an aircraft, and camera unit 120 includes one camera which captures still image frames or video which comprises image frames.

For simplicity of description, embodiments described with reference to FIGS. 2, 3, and 4 refer to sequences in the lateral direction, but similar embodiments may apply for sequences in a direction parallel to the movement direction of the platform, mutatis mutandis.

FIG. 2 is a flowchart of a method 200 for carrying out a mission by an aircraft including scanning of one or more target areas, according to an embodiment of the present invention. In some embodiments, method 200 may include, less, more, and/or different stages than illustrated in FIG. 2. In some embodiments, stages which are illustrated in FIG. 2 as being sequential may instead be performed in parallel and/or stages which are illustrated in FIG. 2 as being performed in parallel may instead be performed sequentially. Method 200 will be described in conjunction with an embodiment of the system of the invention, for example as illustrated in FIG. 3.

FIG. 3 illustrates a system 300 for carrying out a mission including scanning of one or more target areas, according to an embodiment of the present invention. As illustrated in FIG. 3, system 300 includes the following elements: a mission management system (MMS) 310, a navigation system 340 (for example including Global Positioning System (GPS) and/or Inertial Navigation System (INS)), an infra-red camera (IR) 350, a payload control system (PCS) 360, a visible light camera (VIS) 370, a ground exploration station GES 380, a clock 390, and a monitoring display 395. Each element in system 300 may be made up of any combination of hardware, software and/or firmware capable of performing the operations as defined and explained herein. Depending on the embodiment, system 300 may be entirely located onboard a moving aircraft from which the images will be taken, or some of the elements of system 300 may be located onboard and some off-board the aircraft. In some embodiments, system 300 may include more, less, and/or different elements than illustrated in FIG. 3. In some embodiments, functionality ascribed to a particular element in FIG. 3 may be performed by a different element and/or may be shared among more than one element. For simplicity, each element in system 300 is described in the single form, but in some embodiments system 300 may include a plurality of the same element(s).

In the illustrated embodiment, MMS 310 includes the following modules: Planning 312, I_Navigation (i.e. navigation interface) 314, Control 316, Store 318, Scanning 320, Monitoring 322, I_VIS (i.e. interface to visible light camera) 324, I_PCS (i.e. interface to payload control system) 326, UR (i.e. interface infra red camera) 328, database 330, I_GES 332 (i.e. interface to ground exploration station), I_Clock 334 (i.e. interface to clock). Each module in mission management system 310 may be made up of any combination of hardware, software and/or firmware capable of performing the operations as defined and explained herein.

In one embodiment, the modules of MMS 310 are grouped into the following sub-systems:
- radar input/output "RIO" (including inter-alia I_Clock 334 and I_Navigation 314) configured to handle navigation data and the 1 pulse per second "PPS" time signal
- target management system "TMS" (including inter-alia: Scanning 320 and I_PCS 326) configured to manage in real time the scanning of a target area
- mission planning system "MPS" (including inter-alia Planning 312 and Control 316) configured to manage in real time the mission
- image processor (IMP) (including inter-alia I_VIS 324, I_IR, Monitoring 324, Store 318, database 330, I_GES 332), configured to provide the following functionalities: image capture, image processing, data storage and communications.

Before further describing method 200 and system 300, general information on image taking during aircraft missions according to the described embodiment will now be provided.

In the described embodiment, it is assumed that the aircraft is equipped with two cameras, IR 350 and VIS 370, each of which is capable of taking consecutive images (i.e. capable of capturing consecutive frames). Depending on the implementation both cameras may function during the mission, only one camera may function per mission, or only one camera may function at a particular point in time during the mission. However for simplicity of description, the single term camera will be used below and it will be assumed that one camera is capturing the images. For the sake of example, in one implementation VIS 370 is a digital camera with approximately 11 Mpixel (2672×400), pixel-depth of 12 bit and capable of taking 5 images per second, however this example (like all examples herein) should not be construed as limiting. For the sake of example, in one implementation IR 350 takes standard analog video.

According to certain embodiments, the entire sortie of the aircraft is considered one mission, and a leg is a flight segment that is approximately along a straight line at constant altitude and velocity. During a leg, system 200 can perform scanning of one or more target areas, where, as explained above, a target area is covered by a series of frames taken in succession that cover a continuous area on the ground. The point along the leg where control 316 commands the start of performing the scanning of a target area is called the start imaging target "SIT". By minimizing the movement of the camera, time is saved which in some cases may be used to increase the width of the covered area.

A target area is characterized by a target line, which lies parallel along the track of the moving vehicle, and usually indicates the center of the target area (in the across track direction). A "system point of interest" (SPI) is the point where the line of sight (direction of the optical axis of the camera) intersects the ground and should be the center of a frame taken by the camera. The point where imaging of a target area begins is called SPI0 "system point of interest 0". In one embodiment, SPI0 is at the same position in the along track direction as the first end-point of the target line.

In the described embodiment, in stage 202 of method 200, advance planning is conducted of the target areas to be scanned in a mission, with the planning conducted for example using the mission planning workstation mode of Planning module 312 (assumed in this embodiment to be part of the mission planning system). In some cases, Planning module 312 is a GUI module whose mathematical functionality is supplied by Scanning module 320. The output of stage 202 is a mission plan file (MPF). In one embodiment, the MPF is a text file with instructions for all the planned target areas in the mission. In some cases, for each target area, the following information is required: Leg parameters (SIT, heading, altitude, and velocity), SPIO, and imaging mode. It is assumed that for a target area one of two imaging modes can be selected: mono or stereoscopic. The MPF is provided for example to Control module 316 (assumed in this embodiment to be part of the mission planning system). (Note that in some cases, a new target area can be planned during the mission execution, but for simplicity of description, it is assumed in the description herein that all target areas are planned in advance.)

In the described embodiment, in stage 204, during the execution of the mission control module 316 determines whether the moving vehicle is approaching the target area. In some cases, Control module 316 is active throughout the sortie, even if no images are taken, keeping track of the location of the moving vehicle, heading and velocity and comparing the parameters with the mission plan in the MPF so as to be able to activate the scanning process (described below) when appropriate conditions are met. For example, Control module 316 may constantly receive navigation data (for example INS data or GPS data) from I_Navigation 314 (assumed in this embodiment to be part of the radar input/output), compare the received navigation data with the MPF and determine when conditions are appropriate to start performing a scan of the target area.

In the described embodiment, stage 206 occurs once it has been determined that a target area is being approached. In stage 206, Scanning 320 (assumed in this embodiment to be part of the target management system) computes lists of consecutive system points of interest "SPI" for the target area and provides the lists to I_PCS 326 (assumed in this embodiment to be part of the target management system). An SPI is the point where the line of sight (direction of the optical axis of the camera) intersects the ground and should be the center of a frame taken by the camera. Scanning 320 is the main mathematical engine in system 300, providing mathematical, kinematical and/or geometrical calculations that are required by any module of system 300 in order to perform the mission.

In the described embodiment, based on the actual navigation data, and on the actual data of frames already scanned, Scanning 320 calculates ahead where the next several SPI's for the target area should be located. In the described embodiment, each SPI is calculated only once and after being sent to I_PCS 326, the sent SPI cannot be changed, but in other embodiments, there may be a possibility of changing an SPI which has already been sent.

Refer to FIG. 4 which illustrates the capturing of images by a camera onboard the aircraft, according to an embodiment of the present invention. FIG. 4 will be referred to inter-alia when describing the computation of SPI's for a target area. Although FIG. 4 illustrates the continuous acquisition of 60 frames, this should not be considered as limiting the first list of SPI's to 60 frames, nor to limiting the target area to 60 frames. Depending on the embodiment, the first list and any subsequent list may comprise any number of frames, and the target area may comprise any number of frames. FIG. 4 describes a scenario in which each sub-section is covered twice, each sequence contains 5 images and each set is based on 4 sequences.

For a given frame, the footprint on the ground is computed by Scanning 320, where the footprint of the frame is centered on the corresponding SPI. The footprint depends on the aircraft position, the attitude of the camera (i.e. the direction of the Line of Sight (LOS) of the camera), the camera Field of View (FOV) and the local height of the ground which is available from Digital Elevation Model (DEM) data that is available in system 300 (for example in database 330). It is then necessary to calculate the next frame (and corresponding SPI) so that the footprint of the next frame will have an appropriate overlap with the footprint of the frame backward in the along track direction (for example if the next frame in FIG. 4 is 9, then the overlap is between 0 and 9). If sequences of frames are taken across track, then the footprint of the next frame should also have an appropriate overlap with the footprint of the frame previously captured in the across track direction (for example if the next frame in FIG. 4 is 9 then the overlap is between 8 and 9). It is noted that if the overlap along track and/or across track is too small, the area may not be covered continuously. On the other hand, if the overlap is too large, then less area can be covered for a given amount of time. According to certain embodiments of the present invention the only reason for a frame to overlap with the next frame is to overcome inaccuracies in the attitude of the camera (caused for example by random movements of the platform) and therefore to assure full coverage of the target area. This type of overlap is needed because of continuity considerations and is different than the overlap required in certain other systems for producing a stereoscopic view of the area covered by the overlap by using the two overlapped images. Usually the overlap required in order to support the continuity of the coverage is much smaller compared with the overlap that is required in order to produce a stereoscopic view (which is usually at least 50%).

In the described embodiment, there is little advantage of high overlap (i.e. more than 40%) between the footprints of adjacent frames along the track of the moving vehicle (for example frame 0 and 9 in FIG. 4), since even if stereo mode is selected, the stereo effect is not achieved from overlapping sequential frames (as is the case in some of the prior art), but is achieved by repetition of sets of sequences.

In one example, the desired overlap between the footprints of adjacent frames both along the track and across track of the moving vehicle is approximately 20% but the invention is not bound by this value. In some cases, there is an acceptable range of overlap values which can achieve continuous coverage of the area in a satisfactory amount of time.

In the described embodiment, the SPIs computed by Scanning 320 correspond to frames which cover an area characterized by both a width (dimension across track of the moving vehicle) and a length (dimension along track of the moving vehicle), and therefore can be represented in an approximately regular grid as shown in FIG. 4. It should be noted however, that in some cases the grid may not be regular, for example with the width varying along the track. It is also noted that there is no limitation on the number of frames per sequence taken in the across track direction, and therefore in an embodiment where there is one frame in the sequence, the width would be proportional to the footprint of the one frame.

In the described embodiment, it is assumed that it is desirable to maximize the width. Therefore, when deciding on the number of consecutive SPI's in a sequence in the across track direction and thereby influencing the width at a given point along the track, the anticipated length of time involved in capturing frames corresponding to consecutive SPI's in the sequence may be taken into account. For example, the change in attitude (step phase) between consecutive frames in the across track direction takes time, as does the time it takes to stabilize the camera (stare phase) so that the line of sight is pointing to the SPI corresponding to the next frame in the across track direction. If the number of frames in a sequence is too high and therefore the width is too wide, the capturing of a sequence of frames in the across track direction (for example 0 to 4 in FIG. 4) may take too much time, and the coverage of the area will progress more slowly than the moving vehicle (i.e. spot manner). In this case, after each sequence of frames in the across track direction, the line of sight of the camera will have to point further back than for the previous sequence, and there may come a point when it will be impossible to capture the next sequence. On the other hand, if the number of frames in a sequence is too low and therefore the width is too narrow, time will be wasted between consecutive sequences of frames in the across track position (for example between sequence 0 to 4 and sequence 5 to 9) when no frames are captured. See above discussion of formula 2. Alternatively, the excess time may be used in order to acquire the images of next sequences earlier. In this case, after each sequence of frames in the across track direction, the line of sight of the camera will point further forward than the previous sequence, and there may come a point when it will be impossible to capture the next sequence. In the described embodiment, the overlaps between adjacent frames which are parallel to one another along the track do not necessarily have to be uniform for a given pair of consecutive sequences (for example overlap between 4 and 5 versus overlap between 0 and 9 in FIG. 4). As mentioned above, because adjacent overlapping frames along track are not used to achieve the stereo effect, and because there may be an acceptable range of overlap values which can achieve continuous coverage of the area in a satisfactory amount of time, the overlaps between adjacent frames for a given pair of consecutive sequences may vary as long as each overlap is within the acceptable range. Therefore, in this embodiment time may be saved when specifying the SPIs for sequences of frames by specifying an alternation in direction between each sequence of frames across track direction (for example with sequence 0 to 4 taken from far to near and the next sequence 5 to 0 taken from near to far). In this embodiment, the SPI of the first frame in a sequence (for example 5 in FIG. 4) is parallel in the along track direction to the SPI of the last frame (for example 4 in FIG. 4) in the previous sequence, and there is therefore no need to dramatically change the attitude of the camera between the last frame in a sequence and the first frame in the next sequence. In some cases of this embodiment, the time saved may be used towards increasing the number of frames in one or more of the sequences, and therefore increasing the width covered for the target area at one or more points along track or at all points along the track. For example, if the time saved is more than the time required for stepping and staring one or more frames, the SPIs may be computed for one or more additional frames to be captured than if the time was not saved.

In the described embodiment, there are two modes of imaging a target area, mono and stereo. In the mono mode, the SPIs can be computed as discussed until now, where there are acceptable overlaps between adjacent frames, appropriate number of frames sequences in the across direction, and alternation between each sequence of frames in the across track direction so that the SPI of the first frame in a sequence is parallel in the along track direction to the SPI of the last frame in the previous sequence. However if the imaging mode is stereo, then system 300 will also need to take into account that images corresponding in some cases to identical or similar SPIs are to be captured from two different positions.

In the described embodiment, a given SPI of a target area is listed twice (for example appears twice in one list, or appears in two lists of computed SPIs) so that there will be approximately 100% overlap between the two frames corresponding to that SPI. Alternatively, a given SPI only appears once on one list but because stereo mode was specified in the MPF, system 300 knows that frames need to be captured twice. It is desirable however in the described embodiment, that there should be minimal stepping of the camera when performing scanning of the target area and a wide stereoscopic angle. Therefore, in the described embodiment, if stereo mode is specified in the MPF (and optionally SPI's are listed twice), only after capturing a set of s sequences of frames would the camera need to make a large step (i.e. a step greater than the field of view) in order to repeat the same set of s sequences of frames. After repeating the same set of s sequences of frames, the camera would then proceed to capturing the next set of v sequences of frames (where v may or may not equal s). Refer for example to FIG. 4, where SPIs are illustrated as being captured in frames 0 to 19 (where frames 0 to 19 correspond to four sequences of across track frames, meaning s=4), and then the same SPIs are illustrated as being recaptured (in frames 20 to 39) before the camera proceeds to capture new SPIs in frames 40 to 59. According to certain embodiments, the SPIs are computed once, since the same set of s sequences of frames is repeated. However, they are sent twice, at different times, as there are two separate, and in principle independent, requests for images on each SPI.

Although FIG. 4 shows capturing of set images in the same pattern at least twice, capturing in the same pattern should not be considered binding. As the platform continues to move forward, any subsequent capture of set images which cover substantially the same target area or subsection as the initial set capturing may be valid. For instance, in some embodiments, it is possible that the $20^{th}$ to $24^{th}$ frames may be captured in the opposite direction from the direction that the $0^{th}$ to $4^{th}$ frames were captured. Depending on the embodiment, capturing in the same pattern may be more efficient or capturing in a different pattern may be more efficient.

Although FIG. 4 shows coverage of the same target area or sub-section at least twice prior to capturing additional images covering another subsection of the target area (if any), this time progression should not be considered binding. It is possible in some embodiments that one or more (additional) images covering another subsection of the target area may be captured during the time interval between the capture of the first image covering the subsection and the capture of the last image covering the subsection.

Although in the described embodiment, it was mentioned that there may be approximately 100% overlap between two frames corresponding to an SPI, this overlap is not binding. Depending on the embodiment, frames which may be used in producing a stereoscopic view may have 100% overlap, or may have less overlap than approximately 100%. In some embodiments where frames may overlap by less than 100% the given SPIs corresponding to the frames and appearing in the list(s) may not necessarily be identical. In some of these embodiments where overlap may be less than 100%, the total number of SPIs (and therefore the total number of frames) corresponding to each repetition of a set may or may not be the identical.

Depending on the embodiment, the number of image(s) from each repetition of a set which may be used in producing a stereoscopic view may or may not be identical.

As explained above, in some embodiments, the stereoscopic angle equals $$\theta_s = (s-1) \times 0.4 \times (L/R) \text{ radians} \qquad \text{(formula 3)}$$

where L is the frame width and R is the imaging range (i.e. distance from the camera to the center of the imaged surface)

It is noted that in some embodiments of the invention where s>1, the stereo angle may be advantageously increased (i.e. wider) compared to a prior art case where adjacent images with a forward overlap of e.g. 60% are used to generate a stereoscopic image (and where $\theta_s = 0.4 \times (L/R)$ radians as in formula 1 presented in the background section). Assuming for the sake of example that s=8, L=2 km and R=25 km, then using formula (3), $\theta_s = 0.224$ radians or 12.8 degrees. This is an improvement over the 1.8 degrees angle which is achieved using formula (1) for the same L and R and for the prior art case where adjacent images with a forward overlap of 60% are used to generate a stereoscopic image.

In some embodiments of the invention, there is an advantage in that mono mode and stereo mode do not necessarily require different calculations for the SPIs in a set of s sequences of frames. Indeed, the computed SPIs in a given set of s sequences of frames may in some cases be identical for mono and stereo mode. In some of these embodiments however for stereo mode the capture of the same set of the s sequences of frames may be repeated, for instance prior to moving onto the next set of v sequences of frames, whereas for mono mode, the repetition is unnecessary.

Continuing with the description of method 200, in the described embodiment, in stage 208, Control 316 determines that the SIT of the target area is being approached and indicates the approach to Scanning 320, for example by commanding start target.

In the described embodiment, in stage 210, Scanning 320 starts performing the scanning of the target area by activating the first list of computed SPIs for the target area in stage 212.

In the described embodiment, in stage 214, I_PCS 326 translates the SPIs on the list into explicit attitude instructions for the PCS 360. The progression of the moving vehicle is primarily responsible for causing the camera to change the pointing thereof between two consecutive SPIs in the along track position. However, there may be also a change in attitude less than the field of view between two consecutive SPIs in the along track position. It is assumed that the next SPI is forward and parallel along the track from the previous SPI). Assuming a sequence of at least two frames across track, the change in attitude (i.e. stepping) of the camera (for example of VIS 370) is primarily responsible for causing the camera to change the pointing thereof between two consecutive SPIs in a sequence across track. It is noted that a change in attitude takes time, with the time taken in some cases depending inter-alia on the required angular change and gimbals specification (angular acceleration, maximal angular velocity etc.). However, during the time that the attitude is being changed, the moving vehicle progresses along the track, so when the line of sight is at the new angle, the moving vehicle will be in a different position, causing there to be a deviation from the planned SPI. Therefore, the gimbals may need to be moved so that after the time it takes to change the attitude, the line of sight will be in the correct position to point to the SPI, even though the moving vehicle has progressed. As shown in FIG. 3, the gimbals are taken into account by I_PCS 316 when translating the list of SPIs into explicit instructions for PCS 360.

In the described embodiment, in stage 216, the camera captures one or more frames, with the footprint of each frame centered on the corresponding SPI. Given the actual data for the performance of a particular frame, Scanning 320 may update frame data to reflect actual values. Auxiliary data for the frame may also be extracted by Scanning 320 (auxiliary data includes data other than the image itself such as Camera position, attitude and FOV, time etc.).

In the described embodiment, captured images are received by the image processor (for example by modules I_IR 310 and/or I_VIS 324), and undergo processing (for example compressing, storing, demosaicing, focusing, updating) by the image processor (for example by I_GES module 332, Store module 318, and/or monitoring module 324). For instance, the camera may provide to the image processor charge-coupled device CCD data, strobe data, a video signal, etc. In another instance, additionally or alternatively, corresponding auxiliary data which was extracted by scanning 320 may be associated with the images. In another instance, additionally or alternatively, the captured images may be displayed to an operator, and the auxiliary data may be monitored, for example by displaying the footprints on a map on display 395.

If the scanning of the target area is complete, then control 316 commands scanning 320 to stop scanning the target area. Method 200 then iterates to stage 204 for the next target area, if any. In some cases, once all the frames corresponding to the SPIs of a target area have been captured, an array of frames can be used in GES 380 in order to build a single continuous and uniform image (i.e. mosaic) for the entire target area.

If the scanning of the target area is not complete, then method 200 iterates to stage 212 for the next list of computed SPIs.

As noted above, based on the actual navigation data, and the actual frame data for frames which have already been performed, Scanning 360 calculates ahead the next several SPIs and sends the list of the next several SPIs to I_PCS 326. In some cases, the predicted navigation data (e.g. aircraft position and time) corresponding to sent but not yet captured SPIs may be updated based on actual navigation and frame data for already captured frames, with the update typically improving the accuracy in computing subsequent SPIs which have not yet been sent to I_PCS 326. For example, assume that Scanning 360 computes lists of 10 SPIs each at a time. Further assume that seven SPI lists (i.e. up to frame 70) have already been sent to I_PCS 326, and that the last frame captured is frame 60. Therefore, in this example there is actual frame data up to frame 60. Given the actual navigation data, and the actual frame data for frame 60, Scanning 360 can update the prediction of the (previously computed) predicted aircraft position and time at frame 70, based on the previously computed SPIs for frames 60 to 70. Scanning 360 can then compute the SPIs for frames 71 to 80, based on the updated predicted aircraft position/time at frame 70 and send the list of SPIs for frames 71 to 80 to I_PCS 326. In this example, the computation of SPIs 71 to 80 should preferably be completed before frame 70 is actually captured so as to maintain continuity.

In the described embodiment, the previously estimated width that can be covered by a sequence of frames across track may be adjusted during the mission. For example, as the performance of the scanning of the target area progresses, the coverage on the ground may be re-computed (for example continuously) and compared with the progress of the moving vehicle, with the width increased or decreased as necessary. If the ground is relatively flat, the optimal width value will be determined within a few sequences of across track frames. If there is variability in the ground level (e.g. not flat), the number of frames per sequence and therefore the width can continue to be adjusted as needed.

Although for simplicity's sake the term "repetition" was used herein with reference to set capture, it should be understood that repetition does not necessarily mean exact repetition. When capture of a set is repeated as the platform continues to move forward, the set may or may not be identical, even though covering substantially the same target area or subsection. For instance, as mentioned above, it is possible that in some embodiments, images which may be used to produce a stereoscopic view may overlap by approximately 100% or may overlap by less, the number of images included in the set when capture is repeated may or may not be the same as before, and/or set images when capture is repeated may be captured in the same pattern or in a different pattern than before. Therefore, in order to avoid any misunderstanding of the meaning of set "repetition", the disclosure may refer in some places to a first set and to one or more other sets which cover substantially the same target area or subsection rather than to capture of a set and repeating the capture.

It will also be understood that in some embodiments of the invention the system, or one or more elements of the system, may be a suitably programmed computer. Likewise, some embodiments of the invention contemplate a computer program being readable by a computer for executing part or all of a method of the invention. Some embodiments of the invention further contemplate a machine-readable memory tangibly embodying a program of instructions executable by the machine for executing part or all of a method of the invention.

While the invention has been shown and described with respect to particular embodiments, it is not thus limited. Numerous modifications, changes and improvements within the scope of the invention will now occur to the reader.

APPENDIX A

Estimation of Number of Frames in Lateral Direction
The advance (on the ground) of the coverage is:

$$D = (1 - \text{OverlapAlong}) * Fov\text{Columns} * \text{Range};$$

where OverlapAlong is the overlap in the along-track direction (~10-15%) and FovColumns is the horizontal Field of View (in radians)

The available time, for platform with velocity V is:

$$T=D/V;$$

The time required to move the camera towards the adjacent frame in the along-track direction is:

$$t1=2*\text{sqrt}((1-\text{OverlapAlong})*Fov\text{Columns}/\text{AccelerationAlong});$$

where AccelerationAlong is the acceleration (in radians/sec^2) of the gimbals holding the camera, in the along-track direction.

The time required to move the camera towards the adjacent frame in the across-track direction is:

$$t2=2*\text{sqrt}((1-\text{OverlapAcross})*Fov\text{Rows}/\text{AccelerationAcross});$$

where OverlapAcross is the overlap in the across-track direction (~10-15%),

FovRows is the vertical Field of View (in radians) and AccelerationAcross is the acceleration (in radians/sec^2) of the gimbals holding the camera, in the across-track direction.

Finally the number of frames in the lateral direction is:

$$N<=\text{floor}(0.5*(T-2*t1)/t2);$$

Infinite Strip, Finite Spot

In addition to the distinction between Mono and Stereo modes, each of the above can be divided into two submodes: Strip and Spot. In Strip mode the coverage on the ground advances similarly to the platform. The behavior of the system is periodic and the coverage can continue indefinitely. If, however, only finite coverage is required, it is possible to have the coverage on the ground advance slower than the platform.

At the beginning of the leg the covered area is ahead of the platform and gradually it shifts until it is behind the platform at the end of the leg. This enables an increase in the "Time on Target" (T in the formulae above) and consequently in the width of the coverage.

This "Spot" mode should not be confused with the mode where all frames are in the same location ("Stare" mode).

Cameras

The system works exactly the same with any type of camera: VIS, IR, Multi-spectral, Hyper-spectral etc. or any combination of several of those.

Pushbroom

All the descriptions that refer to a "Frame Camera" in "Step & Stare" mode apply to pushbroom cameras as well.

The lateral scanning of the detectors line is essentially the continuous limit of the above mode.

The invention claimed is:

1. A system for scanning a target area including capturing images for use in producing one or more stereoscopic views, said system comprising:
    a planning module configured to prepare data on a target area;
    a navigation module configured to receive navigation data;
    a control module configured to compare navigation data received by the navigation module with data prepared on said target area and to trigger scanning of said target area based on said comparing;
    a scanning module configured to compute system points of interest in said target area in response to said trigger;
    a payload control system configured to translate computed system points of interest into camera attitudes; and
    at least one camera onboard a platform configured to capture images whose footprints are centered around computed system points of interest, based on said camera attitudes, including configured to capture a first set of at least two consecutive image sequences of at least two images each, covering said target area or a sub section thereof, and configured, as said platform continues to move forward, to capture at least one other set of images covering substantially the same target area or sub section thereof, thereby enabling one or more stereoscopic angles to be affected by the number of image sequences included in said first set;
    wherein at least one captured image from each of at least two of said sets are destined to be used in producing a stereoscopic view.

2. The system of claim 1, wherein configured to capture includes configured to capture said set image sequences in alternating directions so that a camera attitude is not adjusted by more than a camera field of view between any two consecutively captured images in said set.

3. The system of claim 1, wherein said first set includes an even number of image sequences.

4. The system of claim 1, wherein each of said image sequences includes images captured sequentially in a direction lateral to a direction of movement of said platform.

5. The system of claim 1, wherein said stereoscopic view is derived from at least two captured images, said images footprints are not centered around consecutive system points of interest within any of said sets.

6. The system of claim 1, wherein a percentage of overlap between adjacent images within any of said sets of images provides continuity in coverage.

7. The system of claim 1, wherein two captured images which are destined to be used in producing said stereoscopic view are captured at a stereoscopic angle which is larger than half a camera Field of View (FOV).

8. The system of claim 1, wherein said platform is configured to move in the air, on land, or on water.

9. The system of claim 1, wherein said at least one camera is selected from a group comprising: visible light cameras, infra-red cameras, multi-spectral, hyper-spectra, still image frames cameras, video cameras, push-broom cameras, or any combination of the above.

10. The system of claim 1, wherein two captured images which are destined to be used in producing said stereoscopic view have 100% overlap.

11. The system of claim 1, wherein said system is further configured to capture additional images covering another subsection of said target area, if any.

12. The system of claim 11, wherein said system is configured to capture said additional images, if any, after capturing said first set and said at least one other set.

13. The system of claim 1, wherein said system is configured to repeat a pattern whereby images of said first set were captured when capturing each of said at least one other set of images.

14. A method of scanning a target area, including capturing images for use in producing one or more stereoscopic views, said method comprising:
    comparing navigation data with target area data and based on said comparing deciding to begin scanning said target area, utilizing a control module;
    computing system points of interest in said target area utilizing a scanning module; and
    from onboard a platform, capturing images whose footprints are centered around computed system points of interest utilizing at least one camera, including:

capturing a first set of at least two consecutive image sequences of at least two images each, covering said target area or a sub section thereof, and as said platform continues to move forward, capturing at least one other set of images covering substantially the same target area or sub section thereof, thereby enabling one or more stereoscopic angles to be affected by the number of image sequences included in said first set;

wherein at least one captured image from each of at least two of said sets are destined to be used in producing a stereoscopic view.

15. The method of claim 14, wherein said capturing includes:

capturing said set image sequences in alternating directions and not adjusting by more than a camera field of view a camera attitude between any two consecutively captured images in said set.

16. The method of claim 14, wherein said first set includes an even number of image sequences.

17. The method of claim 14, wherein each of said image sequences includes images captured sequentially in a direction lateral to said direction of movement of said platform.

18. The method of claim 14, wherein said stereoscopic view is derived from at least two captured images, said images footprints are not centered around consecutive system points of interest within any of said sets.

19. The method of claim 14, wherein a percentage of overlap between adjacent images within any of said sets of images provide continuity in coverage.

20. The method of claim 14, wherein two captured images which are destined to be used in producing said stereoscopic view are captured at a stereoscopic angle which is larger than half a camera Field of View (FOV).

21. The method of claim 14, wherein two captured images which are destined to be used in producing said stereoscopic view have 100% overlap.

22. The method of claim 14, further comprising: capturing additional images covering another subsection of said target area, if any.

23. The system of claim 22, wherein said additional images, if any, are captured after capturing said first set and said at least one other set.

24. The method of claim 14, wherein said platform moves in the air, on land, or on water.

25. The method of claim 14, wherein said images are captured using at least one camera selected from a group comprising: visible light cameras, infra-red cameras, multi-spectral, hyper-spectra, still image frames cameras, video cameras, push-broom cameras, or any combination of the above.

26. The method of claim 14, wherein said capturing of said at least one other set of images includes:

repeating a pattern whereby images of said first set were captured.

27. A computer program product comprising a non-transitory computer-readable storage medium having computer readable program code embodied therein for scanning a target area, including capturing images for use in producing one or more stereoscopic views, said computer program product comprising:

computer readable program code for causing the computer to compare navigation data with target area data and based on said compare to decide to begin scanning said target area;

computer readable program code for causing the computer to compute system points of interest in said target area; and computer readable program code for causing the computer to, from onboard a platform, capture images whose footprints are centered around computed system points of interest, including:

computer readable program code for causing the computer to capture a first set of at least two consecutive image sequences of at least two images each, covering said target area or a sub section thereof, and computer readable program code for causing the computer to, as said platform continues to move forward, capture at least one other set of images covering substantially the same target area or sub section thereof, thereby enabling one or more stereoscopic angles to be affected by the number of image sequences included in said first set;

wherein at least one captured image from each of at least two of said sets are destined to be used in producing a stereoscopic view.

* * * * *